United States Patent
Ishiguro

(10) Patent No.: US 8,533,590 B2
(45) Date of Patent: Sep. 10, 2013

(54) INFORMATION PROCESSING APPARATUS AND LAYOUT PROCESSING METHOD

(75) Inventor: Taisuke Ishiguro, Kamagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 12/577,360

(22) Filed: Oct. 12, 2009

(65) Prior Publication Data

US 2010/0100811 A1    Apr. 22, 2010

(30) Foreign Application Priority Data

Oct. 20, 2008 (JP) ................................. 2008-270074

(51) Int. Cl.
*G06F 17/00* (2006.01)
*G06F 3/048* (2006.01)

(52) U.S. Cl.
USPC .......... 715/243; 715/204; 715/234; 715/244; 715/788

(58) Field of Classification Search
USPC ............... 715/200, 201, 202, 204, 205, 209, 715/210, 226, 243, 249, 251–253, 273, 700, 715/731, 801, 234, 238, 244, 245, 246, 255, 715/274, 760, 788, 800, 815
See application file for complete search history.

(56) References Cited

U.S. PATENT DOCUMENTS

| | | | | |
|---|---|---|---|---|
| 5,381,523 A * | 1/1995 | Hayashi | ........................ | 715/204 |
| 7,343,549 B2 * | 3/2008 | Ohashi et al. | ................. | 715/243 |
| 7,469,378 B2 * | 12/2008 | Nagahara et al. | ............. | 715/243 |
| 7,555,710 B2 * | 6/2009 | Kobashi et al. | ................ | 715/243 |
| 7,665,018 B2 * | 2/2010 | Honda | ........................... | 715/274 |
| 7,707,495 B2 * | 4/2010 | Hosotsubo | ..................... | 715/243 |
| 7,805,672 B2 * | 9/2010 | Kobashi | ........................ | 715/252 |
| 7,847,971 B2 * | 12/2010 | Kobashi et al. | .............. | 358/1.18 |
| 7,900,139 B2 * | 3/2011 | Hosotsubo | ..................... | 715/247 |
| 2004/0078759 A1 * | 4/2004 | Ohashi et al. | .................. | 715/517 |
| 2006/0044615 A1 * | 3/2006 | Kobashi et al. | .............. | 358/1.18 |
| 2006/0048054 A1 * | 3/2006 | Honda | ........................... | 715/517 |
| 2006/0050287 A1 * | 3/2006 | Kobashi et al. | ................ | 358/1.2 |
| 2006/0156227 A1 * | 7/2006 | Hosotsubo | ..................... | 715/517 |
| 2006/0174194 A1 * | 8/2006 | Miyazawa | ...................... | 715/517 |
| 2006/0193008 A1 * | 8/2006 | Osaka et al. | .................. | 358/1.18 |
| 2006/0259860 A1 * | 11/2006 | Kobashi | ......................... | 715/521 |
| 2007/0079236 A1 * | 4/2007 | Schrier et al. | ................. | 715/517 |
| 2007/0288843 A1 * | 12/2007 | Makino | .......................... | 715/517 |
| 2009/0089660 A1 * | 4/2009 | Atkins et al. | .................. | 715/243 |

FOREIGN PATENT DOCUMENTS

| | | |
|---|---|---|
| JP | 5-204899 A | 8/1993 |
| JP | 2005-128925 A | 5/2005 |

* cited by examiner

*Primary Examiner* — Maikhanh Nguyen

(74) *Attorney, Agent, or Firm* — Canon USA Inc. IP Division

(57) ABSTRACT

An information processing apparatus includes a simple layout generation unit configured to generate a simple layout that exemplifies layout results based on document components and a layout template used in a layout of the document components, a presentation unit configured to present the simple layout generated by the simple layout generation unit, a selection unit configured to select the simple layout according to a user operation from the simple layout presented by the presentation unit, and a layout result generation unit configured to execute the layout based on the simple layout selected by the selection unit to generate the layout result.

10 Claims, 14 Drawing Sheets

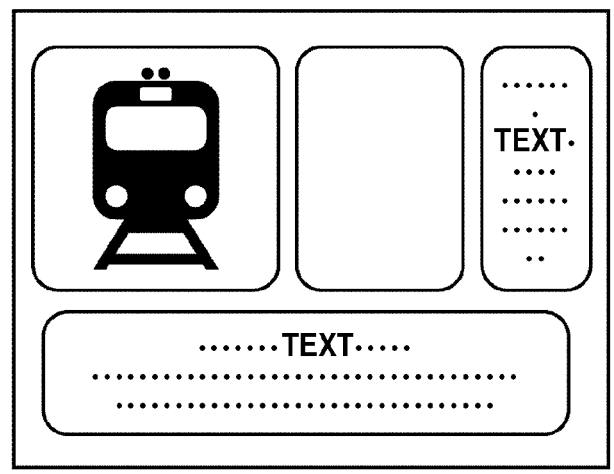
FIG.7A
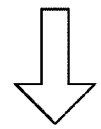
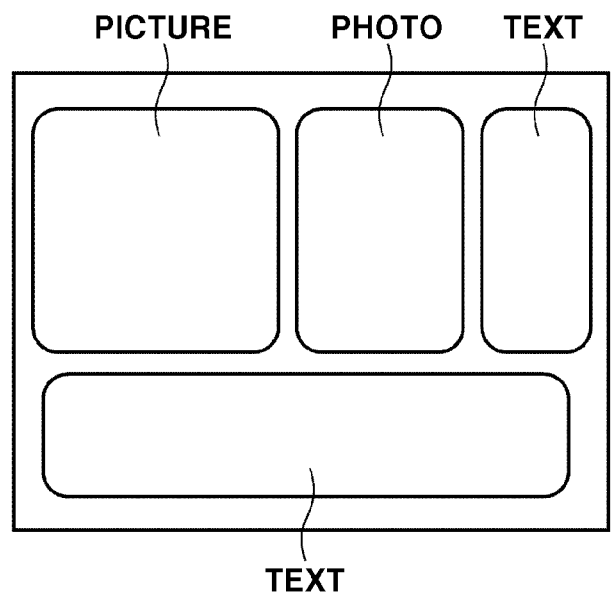
FIG.7B

FIG.8

| DATA ID | ATTRIBUTES | COORDINATE X | COORDINATE Y | WIDTH W | HEIGHT H |
|---------|------------|--------------|--------------|---------|----------|
| 0001    | 1          | X1           | Y1           | W1      | H1       |
| 0002    | 3          | X2           | Y2           | W2      | H2       |
| 0003    | 2          | X3           | Y3           | W3      | H3       |
| 0004    | 1          | X4           | Y4           | W4      | H4       |
| 0005    | 2          | X5           | Y5           | W5      | H5       |

```
                1101                    1105
                  <Templates templates_number=···>
                    ···      1108
1102 ─── <Template id=035 contents_number=4>
1103 ───   <Page width=··· height=···>  1109
1104 ───     <Container x=··· y=··· min_width=··· max_width=···
                                      min_height=··· max_height=···/>
             <Container x=··· y=··· min_width=··· max_width=···
                                      min_height=··· max_height=···/>
             <Container x=··· y=··· min_width=··· max_width=···
                                      min_height=··· max_height=···/>
             <Container x=··· y=··· min_width=··· max_width=···
                                      min_height=··· max_height=···/>
           </Page>  1106
         </Template>                  1107
         <Template id=036 contents_number=4>
                                                      1113
           <Page width=www height=hhh>   ─1112
             <Container x=··· y=··· min_width=··· max_width=···
                                      min_height=··· max_height=···/>
             <Container x=··· y=··· min_width=··· max_width=···
                                      min_height=··· max_height=···/>
             <Container x=··· y=··· min_width=··· max_width=···
                                      min_height=··· max_height=···/>
             <Container x=··· y=··· min_width=··· max_width=···
                          min_height=··· max_height=···/>
           </Page>  1110
         </Template>    1111     1114       1115
         ···
       </Templates>
```

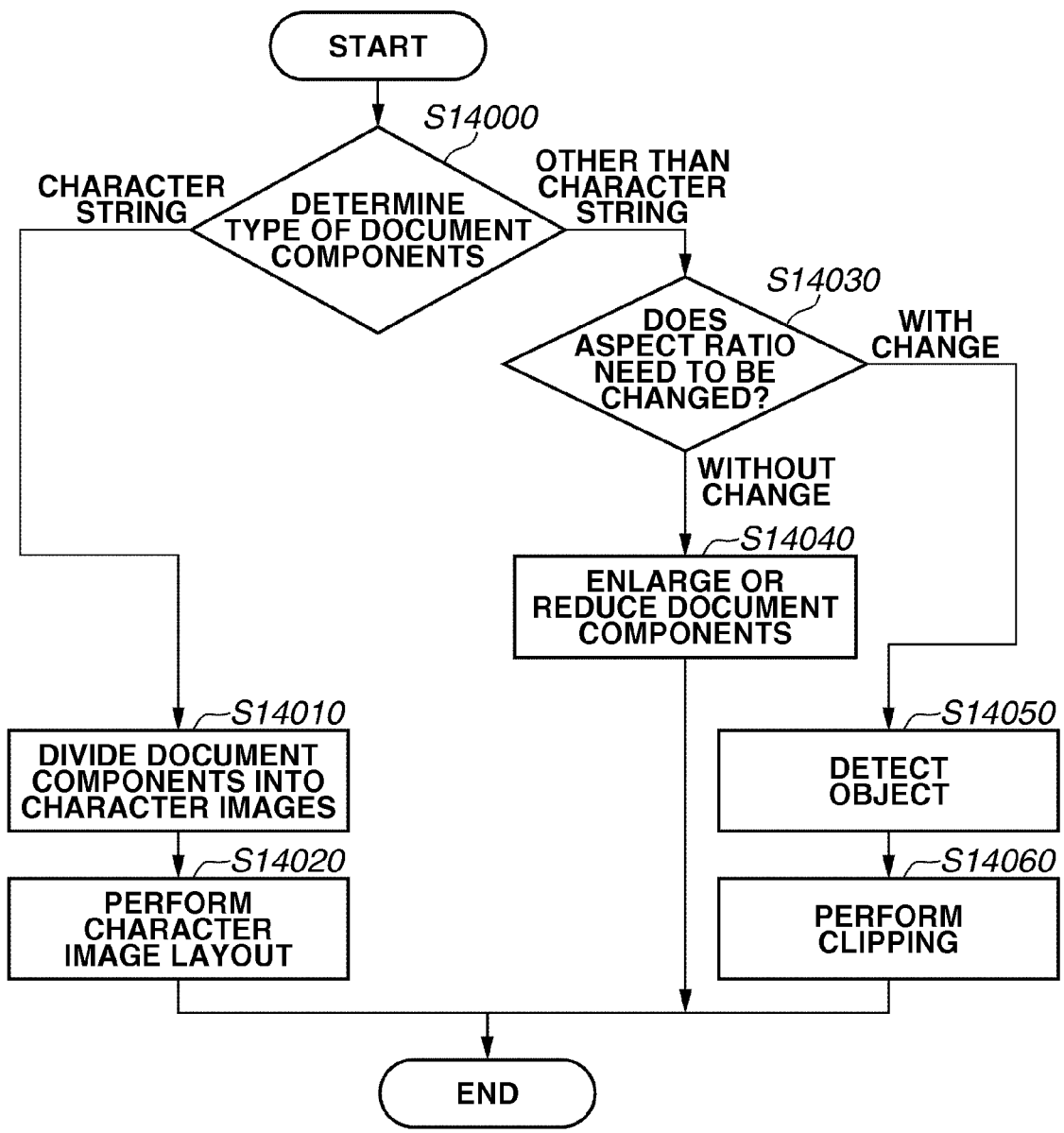

INFORMATION PROCESSING APPARATUS AND LAYOUT PROCESSING METHOD

BACKGROUND OF THE INVENTION

1. Field of the Invention

The present invention relates to an information processing apparatus and a layout processing method.

2. Description of the Related Art

There is a technique for automatically performing a layout of elements which constitute a document (hereinafter, referred to as document component) (e.g., sentences (character strings), figures, tables, and images) in accordance with predetermined layout rules, as an example of document layout processing. However, whether a result of an automatic layout is the one desired by a user is found only after the layout processing has been performed. Therefore, if it is not a desired layout result, substantial changes of the layout result or re-execution of the automatic layout processing is needed in some cases.

As an improvement in such a problem, a technique for performing layout processing using a plurality of layout rules to generate a plurality of layout results is known. Japanese Patent Application Laid-Opened No. 5-204899 discusses a technique for enabling a user to select a layout result the user wants or a layout result close to a desired image from a plurality of generated layout results.

However, when a plurality of the layout results are presented, layout processing is needed each time an individual layout result is created, so that a processing load increases.

SUMMARY OF THE INVENTION

According to an aspect of the present invention, an information processing apparatus includes a simple layout generation unit configured to generate a simple layout that exemplifies layout results based on document components and a layout template used in a layout of the document components, a presentation unit configured to present the simple layout generated by the simple layout generation unit, a selection unit configured to select the simple layout according to a user operation from the simple layout presented by the presentation unit, and a layout result generation unit configured to execute the layout based on the simple layout selected by the selection unit to generate the layout result.

Further, the present invention can be realized as a layout processing method, a program and a storage medium.

According to the present invention, an information processing apparatus can quickly provide a layout result which a user desires without increasing a processing load thereon.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B illustrate a concept of document image analysis processing.

FIG. 8 illustrates an example of document components.

FIG. 11 illustrates an example of extensible markup language (XML) data which includes data of a template in which layout rules are described.

FIG. 14 is a flowchart illustrating an example of the document components arrangement processing of step S12030 of FIG. 13.

DESCRIPTION OF THE EMBODIMENTS

Various exemplary embodiments, features, and aspects of the invention will be described in detail below with reference to the drawings.

Figure 1:
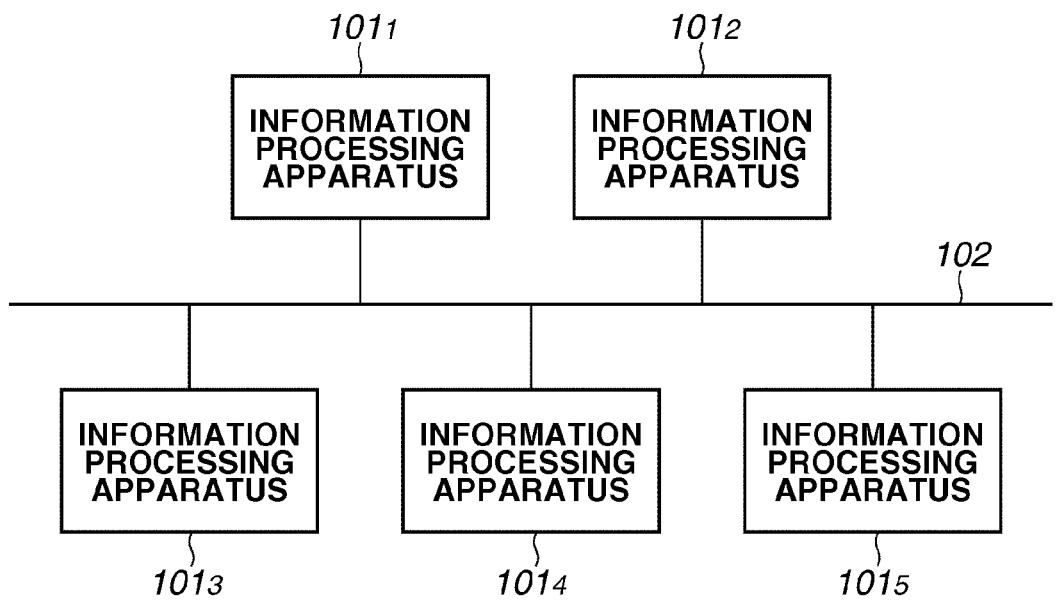
FIG. 1 illustrates an example of a network system constituted by a plurality of information processing apparatuses.

FIG. 1 illustrates an example of a network system constituted by a plurality of information processing apparatuses 101. In the network system, the plurality of information processing apparatuses 101 are connected to a network 102 which serves as transmission medium of various data.

Figure 2:
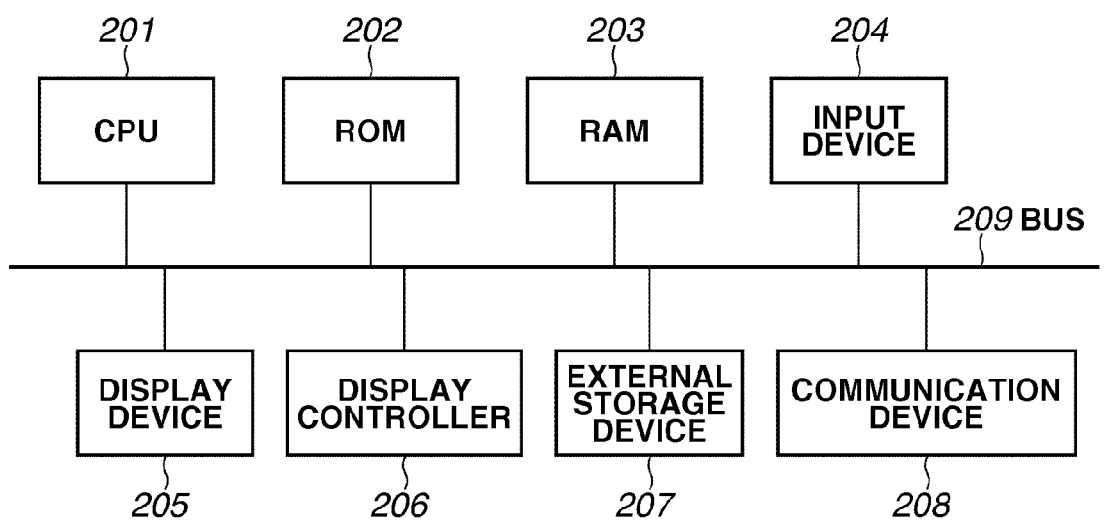
FIG. 2 illustrates an example of a hardware configuration of the information processing apparatus.

FIG. 2 illustrates an example of a hardware configuration of an information processing apparatus. A central processing unit (CPU) 201 performs calculation and logical determinations for each processing, and controls each component connected thereto via a bus 209. A read-only memory (ROM) 202 is a read-only fixed memory and stores a control program code of a processing program or the like executed by the CPU 201. A random access memory (RAM) 203 temporarily stores various data from each component.

An input device 204 is used for inputting information (data). A display device 205 is a cathode-ray tube (CRT), a liquid crystal panel, or the like. A display controller 206 controls a display pattern of dot configuration and a display of a cursor on the display device 205.

An external storage device 207 stores a various pieces of information. As a storage medium which stores these data and programs, a ROM, a floppy disk, a compact disc ROM (CD-ROM), a digital versatile disk ROM (DVD-ROM), a memory card, or a magneto-optical disk can be used. A communication device 208 connects the information processing apparatus 101 to a network such as Ethernet, and establishes connections among the plurality of the information processing apparatuses.

The information processing apparatuses 101 including such components operates according to various inputs from the input device 204 and from the communication device 208 via the network. When inputs from the input device 204 and from the communication device 208 are supplied, an interrupt signal is sent to the CPU 201, and the CPU 201 reads out various control signals (or programs) previously stored in the external storage device 207. Then various controls are performed in response to these control signals.

In the present exemplary embodiment, the information processing apparatus 101 determines a rough layout by first layout processing (generates a simple layout which exemplifies a layout result) with reference to FIGS. 3 to 14. Then, the information processing apparatus 101 performs precise layout processing by second layout processing (executes the layout based on the simple layout, and generates the layout result). An example of the processing will be described below.

Figure 3:
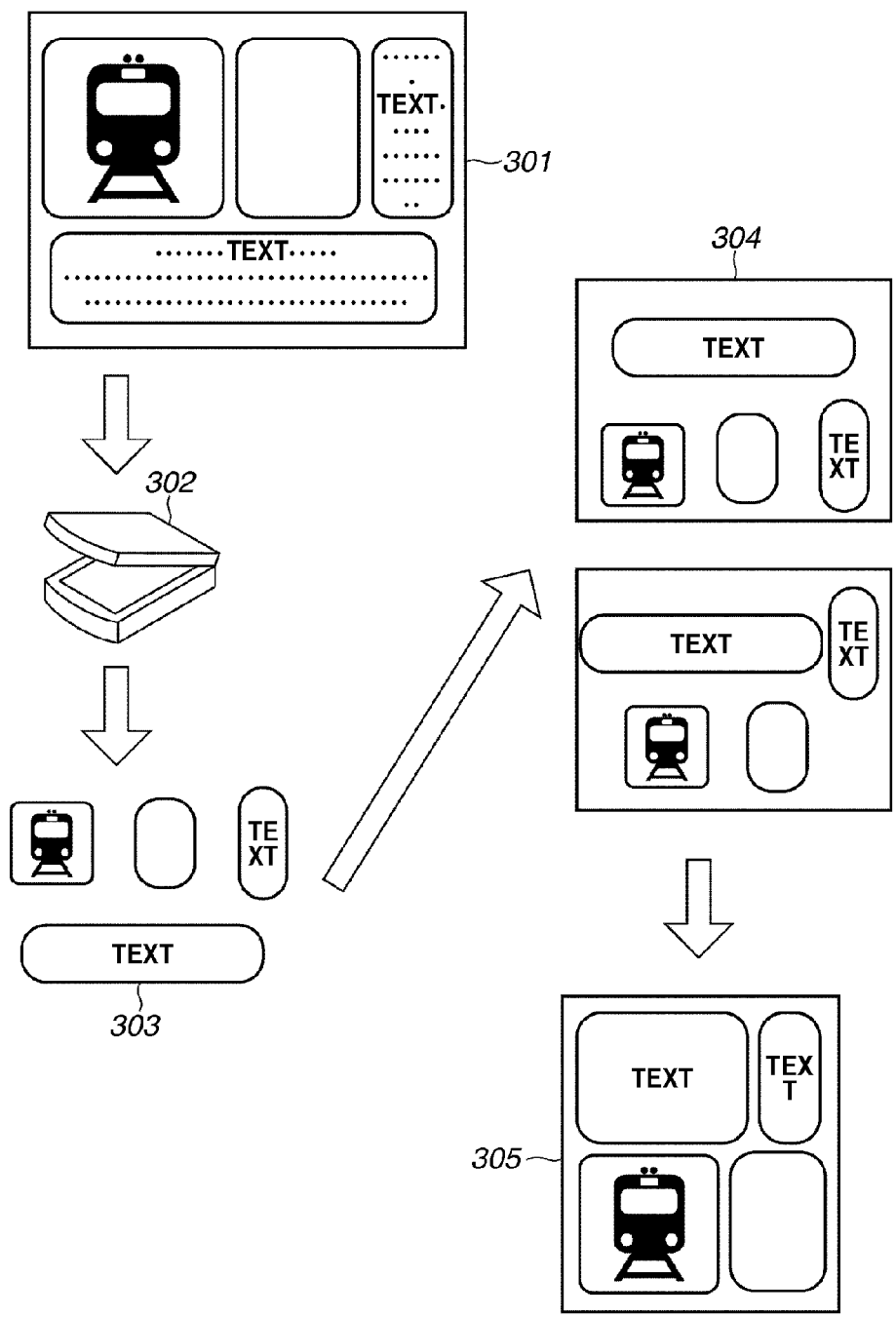
FIG. 3 illustrates an outline of an exemplary embodiment of the present invention.

FIG. 3 illustrates a summary of the present exemplary embodiment. In the present exemplary embodiment, the information processing apparatus 101 scans a document on a paper medium, and indicates a changeable layout for arranging a layout of the scanned document by the first layout processing. Then, the information processing apparatus 101 outputs the layout result by performing the second layout processing to a layout selected from the changeable layout.

The present exemplary embodiment will be described by assuming that the information processing apparatus 101 scans a document on a paper medium. However, a personal computer (PC) or the like which acquires scanned data (document) from a multifunction peripheral (MFP) including a scanner or a scan function may execute the first layout processing and the second layout processing.

The information processing apparatus 101 reads a document 301 on a paper medium by a scanner 302 (e.g., the input device 204 of the information processing apparatus 101), and converts the document into an image. Next, the information processing apparatus 101 extracts document components 303 from the image of the document by the document image analysis processing.

Then, the information processing apparatus 101 performs layout processing using the document components 303, and creates a plurality of simple layout results 304. The plurality of simple layout results illustrate images of layouts, and thus precise layout processing such as adjustment of sizes of document components 303 is not performed.

Further, the information processing apparatus 101 selects a layout from the plurality of simple layout results 304 based on selection by a user (user operation). The selected layout is close to, for example, a layout image which the user desires.

The information processing apparatus 101 performs precise layout processing to the selected layout to obtain a final layout result 305. The information processing apparatus 101 performs adjustment of the sizes of the document components, scaling, deformation, or the like as the precise layout processing. Further, if the document components include character strings, the information processing apparatus 101 puts a layout balance in order by rearranging the character strings as the precise layout processing.

The information processing apparatus 101 does not perform the precise layout processing with a large processing load, at a stage in which a plurality of layouts are generated, but performs the simple layout processing which enables a user to comprehend a layout image. The information processing apparatus 101 performs the precise layout processing with the large processing load only for the layout image which the user desires, and reduces the total processing load. The more detailed processing will be described below with reference to flowcharts.

Figure 4:
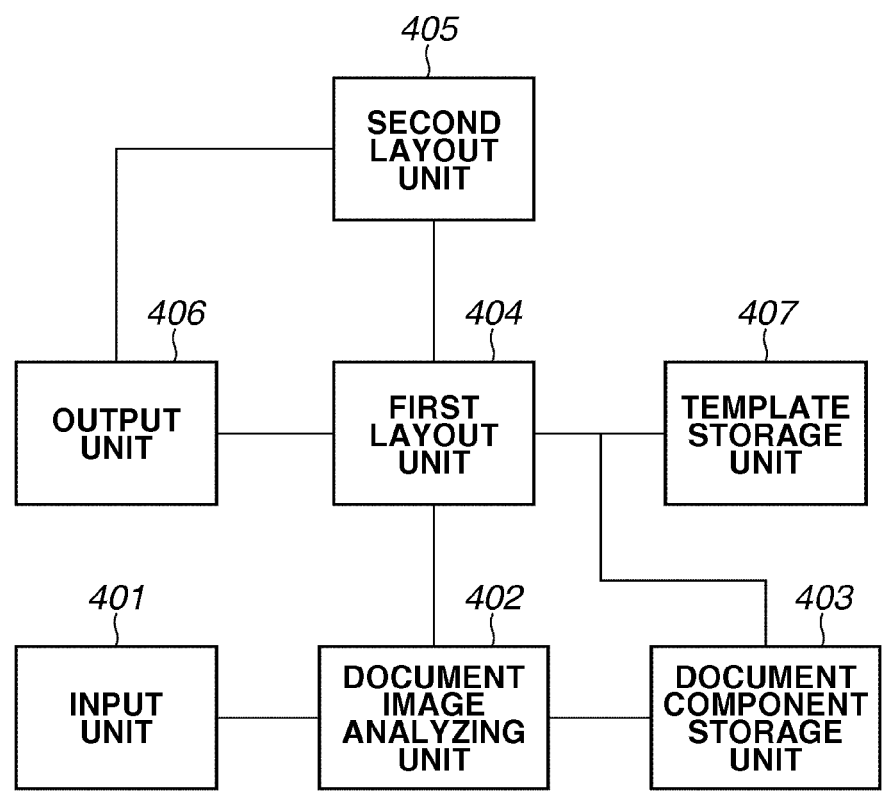
FIG. 4 illustrates an example of a functional configuration of the information processing apparatus.

FIG. 4 illustrates an example of a functional configuration of the information processing apparatus 101. As illustrated in FIG. 4, the information processing apparatus 101 includes an input unit 401, a document image analyzing unit 402, a document component storage unit 403, a first layout unit 404, a second layout unit 405, an output unit 406, and a template storage unit 407 as its functional configuration.

The input unit 401 receives an input and a document image by an operator. The document image analyzing unit 402 analyzes the document image input from the input unit 401, extracts document components (character strings, images, or the like). Information about the extracted document component is stored in the RAM 203 or the external storage device 207 via the document component storage unit 403. The document component information will be described below with reference to FIG. 8.

The document component storage unit 403 stores the information about the document components extracted by the document image analyzing unit 402 in the RAM 203 or the external storage device 207 and manages it.

The first layout unit 404 performs layout processing based on the document components stored in the RAM 203 or the external storage device 207 via the document component storage unit 403 and layout templates stored in the RAM 203 or the external storage device 207 via the template storage unit 407. The layout templates are retained by the template storage unit 407 in association with a number of the document components. The first layout unit 404 performs the layout processing on all layout templates associated with the number of document components of processing target documents managed by the document component storage unit 403. The details of the processing in the first layout unit 404 will be described below with reference to FIG. 9.

The second layout unit 405 performs the precise layout processing based on the layout result by the first layout unit 404. As previously described, the precise layout refers to processing including deformation of the document components or the like. The details of the processing in the second layout unit 405 will be described below with reference to FIG. 13.

The output unit 406 outputs (or presents) the layout result by the first layout unit 404 and the second layout unit 405 (presentation of the layout result).

Figure 10:
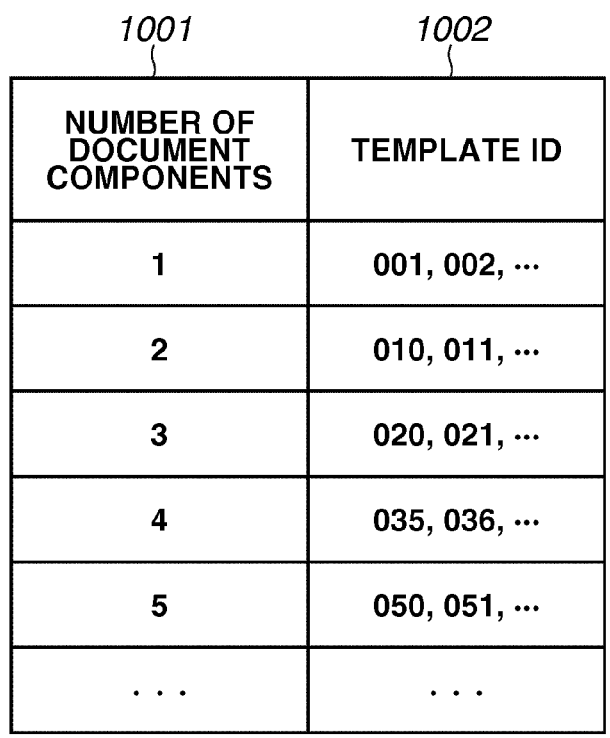
FIG. 10 illustrates an example of a template table which associates template data with a number of document components.

The template storage unit 407 stores templates which define information about layouts in the RAM 203 or the external storage device 207 and manages them. As illustrated in FIG. 10, which will be described below, the template storage unit 407 stores a template table which associates template ID 1002 with a number of document components 1001 in the RAM 203 or the external storage device 207 and manages the template table. For example, the template storage unit 407 identifies the template ID from the number of document components and accesses to actual template data using the template ID.

When the number of document components is 2, for instance, it can be understood that templates with the template IDs of 010, 011, and the like are associated with the number of document components. The template data is stored in an extensible markup language (XML) format as shown in FIG. 11. For instance, the template storage unit 407 can refer to the template data using the template ID. The details of the template table and the template data will be described below with reference to FIGS. 10 and 11.

Figure 5:
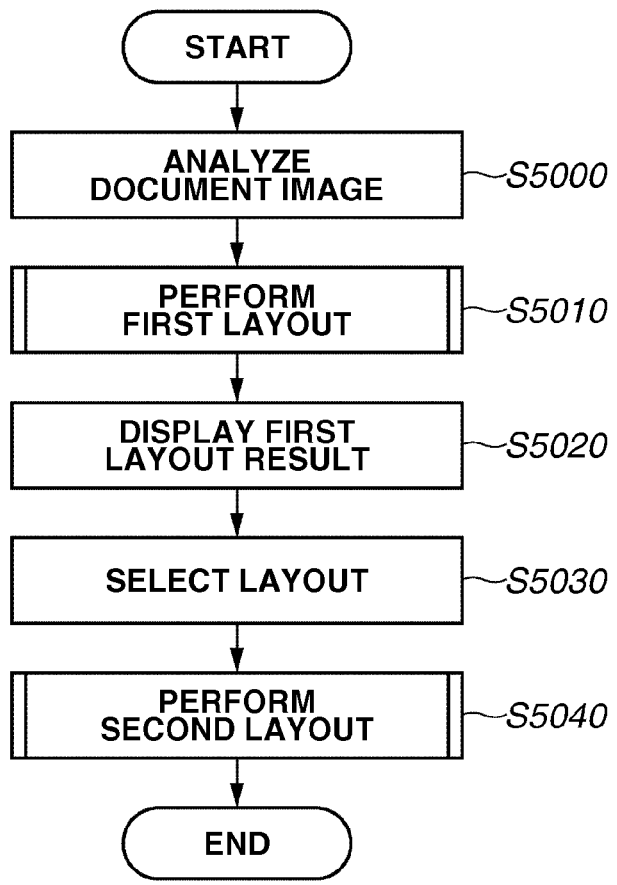
FIG. 5 is a flowchart illustrating an outline of processing of the exemplary embodiment of the present invention.

FIG. 5 is a flowchart illustrating a summary of processing of the present exemplary embodiment. In step S5000, the document image analyzing unit 402 performs document image analysis processing. The document analysis processing analyzes the document image, and extracts the document components. The details of the document image analysis processing will be described below.

In step S5010, the first layout unit 404 performs the first layout processing. The first layout unit 404 acquires a plurality of layout templates based on the document components extracted in step S5000, and creates a plurality of layouts using the acquired templates (generates simple layouts). The details of the first layout processing will be described below with reference to FIG. 9.

Figure 6:
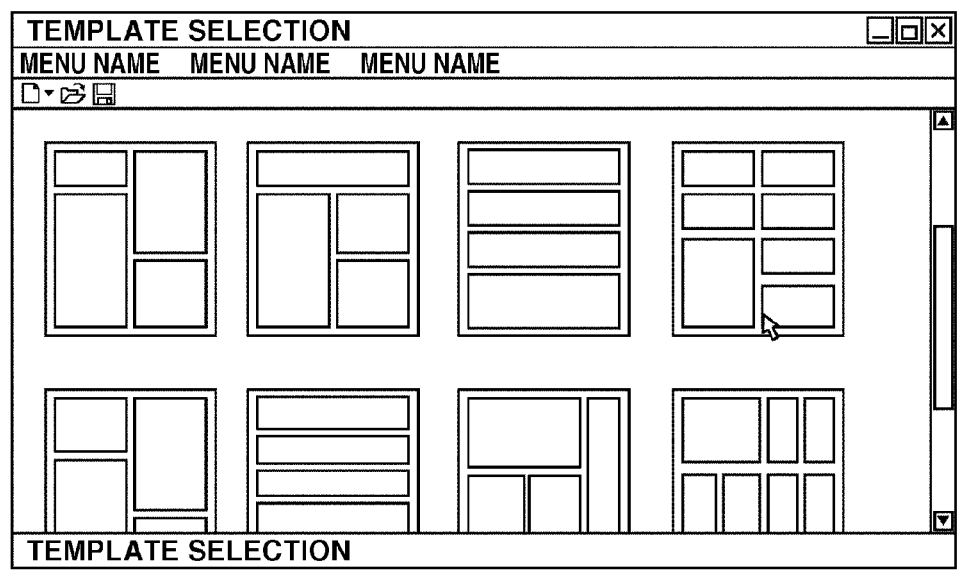
FIG. 6 illustrates an example of a simple layout.

In step S5020, the output unit 406 displays a result of the first layout processing in step S5010 (simple layouts) on the display device 205 or the like, and presents them to a user. FIG. 6 illustrates an example of the simple layouts.

In step S5030, the input unit 401 or the second layout unit 405 selects the layout (simple layout) from the plurality of layouts (simple layouts) displayed in step S5020 according to selection by the user.

In step S5040, the second layout unit 405 performs the second layout processing based on the simple layout selected in step S5030. The second layout unit 405 performs the layout processing (generates a layout result) again on the simple layout selected in step S5030. The details of the second layout processing will be described below with reference to FIG. 13. The output unit 406 displays the result of the second layout processing (the layout result) on the display device 205 or the like, to present the layout result to the user.

The document image analysis processing of step S5000 of FIG. 5 will be described in more detail. The document image analysis processing refers to processing for recognizing meaningful blocks as a cluster from images, determining an attribute of each block, and dividing the cluster into blocks which have different attributes.

FIGS. 7A and 7B illustrate a concept of the document image analysis processing. For instance, when the document image analyzing unit 402 performs the document image analysis processing on a raster image of FIG. 7A, the raster image is divided into blocks of characters and images, as illustrated in FIG. 7B.

An example of the document image analysis processing will be illustrated. The document image analyzing unit 402, upon receiving an input image, binarizes the image into white and black images. Then, the document image analyzing unit 402 traces a contour of the image to extract a cluster of pixels surrounded by a black pixel contour. When the black pixels is larger than a specific area, the document image analyzing unit 402 traces a contour on white pixels which are present in the black pixels to extract a cluster of the white pixels. The document image analyzing unit 402, if the cluster of the extracted white pixels is larger than a specific area, further extracts a cluster of the black pixels. The document image analyzing unit 402 recursively executes the extraction processing, if the extracted cluster is larger than the specific area.

The document image analyzing unit 402 classifies the clusters of the black pixels obtained by the above-described processing into blocks having various attributes according to their sizes and shapes. For instance, the document image analyzing unit 402 classifies a block whose aspect ratio is close to 1 as a cluster of pixels corresponding to characters. When adjacent clusters of pixels corresponding to characters are aligned and can be grouped, the document image analyzing unit 402 classifies the adjacent clusters of pixels as a character string block. When irregular clusters of pixels may be scattered, the document image analyzing unit 402 classifies the irregular clusters of pixels into a photo block, and otherwise, into a graphics block or the like. The document image analyzing unit 402 stores positional information and attributes of the classified blocks as the document component information in the RAM 203 or the external storage device 207.

FIG. 8 illustrates an example of document components. As illustrated in FIG. 8, the document component information includes data ID 801 for uniquely determining each component, attribute 802 of the component (1: character string, 2: drawing, 3: photo), position coordinates 803 and 804 (X and Y) of the component, a width W 805 and a height H 806 of a circumscribed rectangle of the component. The position coordinate 803 of the component is a position coordinate when a left top point of the image on the document is assumed to be an original point (0, 0). The width W 805 and the height H 806 of the component are represented by a number of pixels.

Figure 9:
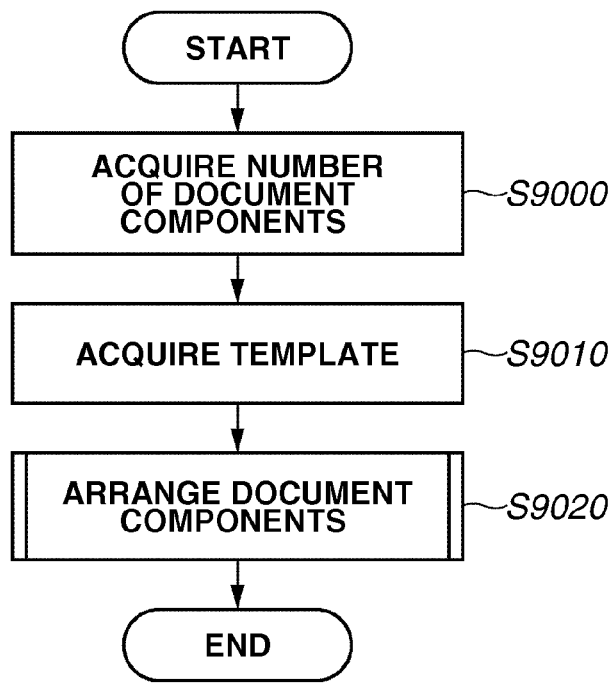
FIG. 9 is a flowchart illustrating an example of first layout processing.

The first layout processing of step S5010 of FIG. 5 will be described. FIG. 9 is a flowchart illustrating an example of the first layout processing. In step S9000, the first layout unit 404 acquires a number of document components to be laid out. The document components are managed and stored by the document component storage unit 403, as previously described, in a format illustrated in FIG. 8.

In step S9010, the first layout unit 404 acquires templates. The first layout unit 404 determines template ID for identifying a template which can be used for the layout from the number of document components, and accesses to actual template data from the template ID.

More specifically, the first layout unit 404 refers to the template table illustrated in FIG. 10, and identifies the template ID which is associated with the number of document components acquired in step S9000. For instance, when the number of document components is 5, the first layout unit 404 identifies the template IDs as 050, 051, and the like. After identifying the template ID, the first layout unit 404 accesses to an appropriate element of the template ID from template data described in XML illustrated in FIG. 11 and acquires the template data. In an example when the number of document components is 5, elements which correspond to ID=050, ID=051, and the like in data illustrated in FIG. 11 are the actual template data.

In step S9020, the first layout unit 404 performs arrangement processing of the document components. More specifically, the first layout unit 404 arranges the document components acquired in step S9000 based on the template data acquired in step S9010. The details of the document components arrangement processing will be described below with reference to FIG. 12.

A method for storing the template data will be described with reference to FIGS. 10 and 11. FIG. 10 is the template table which associates the template data with the number of document components, and is composed of the number of document components 1001 and the template ID 1002.

The number of document components 1001 indicates the number of document components which can be arranged in the template associated therewith. For instance, it indicates that the templates which are associated with the number of document components of 3 (ID=020, 021, and the like) can arrange three document components therein.

The template ID 1002 is a number for uniquely identifying template data, and a different number is assigned to each template data. For instance, when the number of document components is 3, it can be understood that the template IDs are 020 and 021 from FIG. 10.

FIG. 11 illustrates an example of XML data which describes template data in which layout rules is described. The template data includes a root element 1101 which indicates a root of the template data, a template element 1102 which indicates an entity of the template data, and a page element 1103 which indicates information about a page of the template. Further, the template data includes a container element 1104 which indicates information about locations where the document components are arranged.

The root element 1101 is a root element for organizing a plurality of template elements, and is an element which becomes a root of the XML data. In other words, only one root element exists in the XML data which describes the template data. The root element has an attribute (templates_number) 1105 which indicates a total number of entities of the template data.

The template element 1102 is an element which indicates an entity of the template data, and includes a template ID (id) 1106 for identifying a template and a number of document components (contents_number) 1107 which can be arranged in the template as attributes. For instance, it can be understood from FIG. 11 that four document components can be arranged in the template with the template ID 035.

The page element 1103 includes a width 1108 and a height 1109 of a layout region as page information of the template. For instance, a size of a page in the template with the template ID 036 will be height hhh and width www.

The container element 1104 includes information about positions and sizes of regions where the document components are arranged as an attribute. More specifically, the container element 1104 includes an x attribute 1110 and a y attribute 1111 which respectively indicate an x coordinate and a y coordinate of a left top apex of the layout region, assuming a left top point of a page region to be an origin point of a layout position.

Further, the container element 1104 includes, as an attribute which indicates a size of a region, a maximum size and a minimum size of the region. More specifically, the container element 1104 includes a min_width attribute 1112 which indicates a minimum width of the region, a max_width attribute 1113 which indicates a maximum width, a min_height attribute 1114 which indicates a minimum height, and a max_height attribute 1115 which indicates a maximum height. Dimensions of the region size are changeable within a range predetermined herein, and is adjusted according to sizes of the document components and a relationship between document components. The adjustment processing is similar to processing performed in the second layout processing in the present exemplary embodiment.

The template data has been described above. Here, data on one page is exemplified as a template, but the data may include a plurality of pages. Further, although only a position of region and a changeable size range is exemplified as the container elements, an attribute which indicates permission to arrange a plurality of document components in a region may be added. Along with the permission to arrange the plurality of document components, how to arrange the document components within the region (e.g., arrange in a column direction, or in a row direction) can be added as an attribute.

Figure 12:
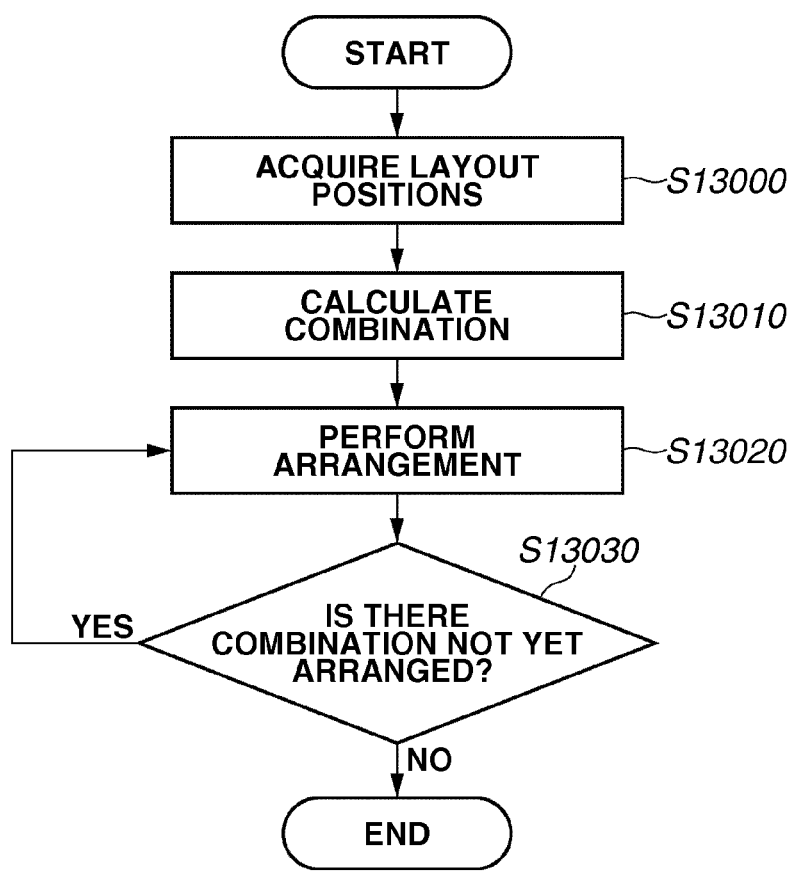
FIG. 12 is a flowchart illustrating an example of document components arrangement processing.

Document component arrangement processing of step S9020 in FIG. 9 will be described. FIG. 12 is a flowchart illustrating an example of the document component arrangement processing. In step S13000, the first layout unit 404 performs layout position acquisition processing. More specifically, the first layout unit 404 acquires positions of the region where the document components can be arranged from the container elements in the template data. If there is a plurality of the regions (if there is a plurality of the document components), the first layout unit 404 performs acquisition processing on all regions.

In step S13010, the first layout unit 404 performs combination calculation processing. More specifically, the first layout unit 404 calculates combinations (or permutations) when an arrangement sequence of the document components is considered. The first layout unit 404 stores a calculation result in a combination table (not illustrated).

The combination calculation processing will be described using an example. When the number of document components is 3, there are six combinations which take into consideration of the arrangement sequence. When the document components include an element 1, an element 2, and an element 3, the six combinations which take into consideration the arrangement sequence are given as follows: (1) the element 1, the element 2, and the element 3. (2) the element 1, the element 3, and the element 2. (3) the element 2, the element 1, and the element 3. (4) the element 2, the element 3, and the element 1. (5) the element 3, the element 1, and the element 2. (6) the element 3, the element 2, and the element 1.

Although the combinations are calculated assuming that there are no constraints of the arrangement sequence among respective document components, the constraints may be placed on the arrangement sequence. For instance, if there is a relationship that a document component A must come after a document component B, the first layout unit 404 may calculate combinations which observe the constraint. In the document image analysis processing, if a relationship among the document components can be extracted, it is effective to place such a constraint. By doing this, only a layout which maintains a sequence of the document components extracted as character strings and a relationship among figures and their captions can be created.

In step S13020, the first layout unit 404 performs arrangement processing. More specifically, the first layout unit 404 arranges the document components to the layout positions acquired in step S13000. The first layout unit 404 acquires the arrangement sequence of the document components from the combination table. The first layout unit 404 deletes the combination which has been arranged from the combination table.

In step S13030, the first layout unit 404 determines whether there is any combination not yet arranged by referring to the combination table. If there is the combination not yet arranged, (YES in step S13030), the processing returns to step S13020. If there is no combination not yet arranged (NO in step S13030), the first layout unit 404 terminates the processing illustrated in FIG. 12. The first layout processing and related processing have been described above in detail. Next, the second layout processing of step S5040 of FIG. 5 will be described in detail.

Figure 13:
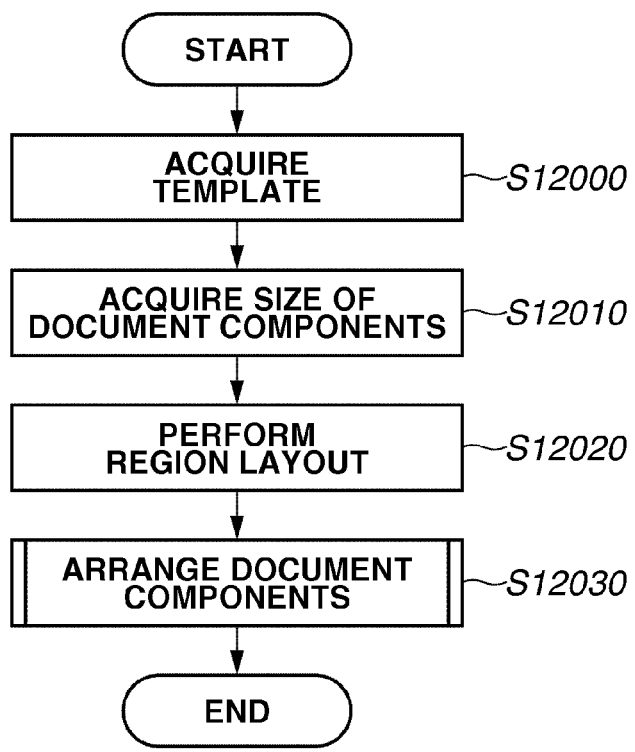
FIG. 13 is a flowchart illustrating an example of second layout processing.

FIG. 13 is a flowchart illustrating an example of the second layout processing. In step S12000, the second layout unit 405 performs template acquisition. More specifically, the second layout unit 405 acquires the template data based on layout data (simple layout) selected by a user from the result of the first layout processing. The template data is in XML format which has been described with reference to FIG. 11.

In step S12010, the second layout unit 405 acquires sizes of the document components. More specifically, the second layout unit 405 acquires the sizes of all document components which are laid out in the selected result (simple layout) of the first layout processing. The size of each document component is stored in the table illustrated in FIG. 8, and the second layout unit 405 acquires the size of each document component by referring to the table. For instance, the second layout unit 405 can acquire a width W1, and a height H1 as a size of data ID 001 in FIG. 8.

In step S12020, the second layout unit 405 performs region layout processing. More specifically, the second layout unit 405 calculates a size of a layout region where the document components are actually arranged based on the template data acquired in step S12000 and the sizes of the document components acquired in step S12010. As described above, a maximum value and a minimum value of the region where the document components are arranged are specified in the template. The second layout unit 405 determines the size of the layout region which satisfies the maximum value and the minimum value and in which change in the sizes of the document components may be kept to a minimum. The region layout processing is implemented by existing layout techniques.

In step S12030, the second layout unit 405 performs arrangement processing of the document components. More specifically, the second layout unit 405 arranges the document components in the region calculated in step S12020. The details of the document component arrangement processing will be below described with reference to FIG. 14.

FIG. 14 is a flowchart illustrating an example of the document component arrangement processing of step S12030 of FIG. 13. In step S14000, the second layout unit 405 determines a type of the document component. More specifically, the second layout unit 405 determines whether the document component is a character string. As previously described in FIG. 8, the document component has the attribute. The second layout unit 405 determines whether the document component is the character string based on the attribute. If the document component is the character string (CHARACTER STRING in step S14000), the processing proceeds to step S14010. If the document component is not the character string (OTHER THAN CHARACTER STRING in step S14000), the processing proceeds to step S14030.

In step S14010, the second layout unit 405 divides the document component which is the character string into individual character images. More specifically, the second layout unit 405 perform conventional character image clipping processing such as an optical character recognition (OCR) processing or the like. If the document component is image data describing a character string, e.g., "layout", the second layout unit 405 divides it into character images, "l", "a", "y", "o", "u", and "t".

In step S14020, the second layout unit 405 performs layout of the character images. More specifically, the second layout unit 405 performs layout of the character images divided in step S14010 in the layout region.

For instance, the second layout unit 405 can implement the layout by arranging the character images in order in the region. If the character images do not fit into the region, the second layout unit 405 may reduce all character images at the same rate so that they may be fitted into the region. Further, if there is a white space in the region, the second layout unit 405 enlarges all character images at the same rate so that the white space of the region can be minimized.

Further, the second layout unit 405 can perform character recognition processing on the character images to apply composition rules during layout processing. In this case, the second layout unit 405 separately stores the composition rules, and will apply them as a constraint during arrangement of the character images. The application of the composition rules can prevent, e.g., punctuation marks such as "." from being arranged on a head of line.

Further, the second layout unit 405 may perform the layout processing using font data managed by a computer based on a result of character recognition by OCR without laying out the character images as they are. Since the character recognition processing generally causes erroneous recognition, it is not used in the present exemplary embodiment. In the present exemplary embodiment, the second layout unit 405 performs the layout processing using the character images as they are in order to minimize an influence of erroneous recognition.

In step S14030, the second layout unit 405 determines whether an aspect ratio of the document component needs to be changed. More specifically, the second layout unit 405 determines whether the document component fit into the layout region even if the aspect ratio is not changed by comparing an aspect ratio of the document component other than the character string and an aspect ratio of the layout region.

For instance, if the aspect ratio of the document component is 4:3 and the aspect ratio of the layout region is 3:4, the second layout unit 405 determines that the document component can not be arranged while maintaining the aspect ratio of the document component owing to difference of the aspect ratios. If the aspect ratio does not need to be changed (WITHOUT CHANGE in step in S14030), the processing proceeds to step S14040. If the aspect ratio needs to be changed (WITH CHANGE in step in S14030), the processing proceeds to step S14050.

In step S14040, the second layout unit 405 scales up or down the document component to arrange it in the layout region. More specifically, the second layout unit 405 enlarges or reduces the document component up to a size of the layout region. For instance, if the layout region has a width of 100 and a height of 150, and the document component has a width of 300 and a height of 450, and then the second layout unit 405 reduces the width of the document component to 100, and the height thereof to 150.

In step S14050, the second layout unit 405 detects an object from the document components. If any object is not detected by object detection processing, the second layout unit 405 sets a center of the document component as the object.

The second layout unit 405 detects an object using existing techniques. As the existing techniques, for instance, there is a technique for detecting a face region from a photograph in which a person is captured. When a plurality of object detection techniques are used, for instance, the second layout unit 405 sets in advance priority to individual object detection techniques (object detection methods). Then, the second layout unit 405 performs object detection processing using the methods in the order of descending priority. If the object is detected, the processing may be terminated.

In step S14060, the second layout unit 405 performs clipping of the document component to the size of the layout region centering on the object detected in step S14050, and arranges clipped document component. For instance, if a face is detected from the document component (image), the second layout unit 405 performs clipping processing centering on the face, and arranges a clipped image in which the face is located at the center. In step S14050, if the object is not detected, the second layout unit 405 determines the center of the document component as the center of the clipping region, since the center of the document component has been set as the object.

A clipping operation which is meaningful to some degree can be performed by being based on the object detection. For instance, when an image is arranged in a region, and if a shape and a size of the image and the region are different from each other, scaling or clipping needs to be performed on the image. Scaling including change in the aspect ratio is not preferable since it substantially changes an impression of the image. Thus, clipping will be performed, but if a position to be clipped is simply determined, an object in the image may be divided by the clipping. When processing is simply performed in which the center of the clipping is set on the center of the image, a phenomenon such that a face portion of a person is divide into half may occur. The second layout unit 405 detects an object, and performs the clipping based on a result of the detection, so that it can prevent division of the object.

Arrangement of the document components in the second layout processing has been described above in detail with reference to FIG. 14. In this process, layout in which properties of the document components are utilized can be performed by changing an arrangement method according to the type of the document components. For instance, character strings can be flexibly laid out compared to images. Character strings can be arranged in regions of various shapes only by changing a line feed position.

More specifically, character strings are adaptable to both a vertically long region and a horizontally long region by changing line feed positions. On the other hand, in the case of an image, flexibility to cape with change in the region shape is low. When a vertically long image is arranged in a horizontally long region, it is required to enlarge/reduce the image by changing an aspect ratio or perform clipping on the image.

When clipping is needed, the clipping centering on the object can be performed by using the object detection. The clipping has an effect of reducing division of the object.

A layout method which can reduce processing load has been described above with reference to FIGS. 3 to 14. The first layout unit 404 implements only processing whose processing load is relatively small, and generates a simple layout at a level that a layout image can be confirmed. Then, a user selects a layout close to a desired image from the simple layout. The second layout unit 405 performs processing with large processing load on a selected layout, so that the processing load of the whole layout processing can be reduced. In the present exemplary embodiment, the total processing load is reduced using two types of layout processing, but the processing load can be reduced by using an arbitrary number of the layout processing.

Further, the present invention can be accomplished by supplying a system or an apparatus with a storage medium (or a recording medium) which has stored a program code of software which implements functions of the above-described exemplary embodiments, and causing a central processing unit (CPU or a micro processing unit (MPU)) of the system or apparatus to read out and execute the program code stored in the storage medium. In this case, the program code itself read from the storage medium implements the functions of the above-described exemplary embodiments, and the storage medium in which the program code is stored constitutes the present invention.

Further, the central processing unit of the system or the apparatus executes a read program code. An operating system (OS) or the like running on the system or the apparatus can perform a part or whole of the actual processing based on an instruction of the program code. The case where the above-described functions of the exemplary embodiments are implemented by these processing also constitutes the present invention.

Furthermore, the program code read out from the storage medium is written in a memory provided in a function expansion card inserted into the system or the apparatus or a function expansion unit connected to the system or the apparatus. Then, the CPU or the like equipped in the function expansion card or the function expansion unit performs a part or whole of the actual processing based on the instruction of the program code. The case where the functions of the above-described exemplary embodiments are implemented by these processing also constitutes the present invention.

If the exemplary embodiments of the present invention are applied to the storage medium, a program code corresponding to the flowcharts previously described will be stored in the storage medium (computer-readable storage medium).

According to the above-described exemplary embodiments of the present invention, an apparatus can quickly provide a result of layout which a user desires without putting a processing load on the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-270074 filed Oct. 20, 2008, which is hereby incorporated by reference herein in its entirety.

What is claimed is:

1. An information processing apparatus comprising:
   a processor configured to provide instructions for a simple layout generation unit configured to generate a plurality of simple page layouts that exemplifies page layout results based on a quantity of document components and a page layout template used in a page layout of the document components, arrangement of the document components based on acquired layout positions is performed;
   the processor providing instructions for a presentation unit configured to present the plurality of simple page layouts generated by the simple layout generation unit;
   the processor providing instructions for a selection unit configured to select at least one of the simple page layouts according to a user operation from the plurality of simple page layouts presented by the presentation unit; and
   the processor providing instructions for a layout result generation unit configured to execute the page layout based on the simple page layout selected by the selection unit to generate a precise page layout result, wherein the precise page layout is generated by acquiring sizes of the document components and calculating a size of a layout region where the document components are actually arranged based on a maximum and a minimum value of the region where the document components are arranged.

2. The information processing apparatus according to claim 1, wherein the adjustment processing includes size adjustment of one of the document components.

3. The information processing apparatus according to claim 1, wherein the adjustment processing includes deformation of one of the document components.

4. The information processing apparatus according to claim 1, wherein the adjustment processing includes amendment of character of one of the document components based on a composition rule.

5. The information processing apparatus according to claim 1, wherein the adjustment processing includes cropping one of the document components based on detected object in the document component.

6. The information processing apparatus according to claim 1, wherein the adjustment processing includes changing a line feed position of character strings of one of the document components.

7. The information processing apparatus according to claim 1, wherein the respective document components are classified photo or character or graphic.

8. The information processing apparatus according to claim 1, wherein the plurality of page layout templates are described in XML.

9. A method for executing layout processing in an information processing apparatus, the method comprising:
   generating a plurality of simple page layouts which exemplifies page layout results based on a quantity of document components and a layout template used in a page layout of the document components, arrangement of the document components based on acquired layout positions is performed;

presenting the plurality of generated simple page layouts;

selecting at least one of the simple page layouts according to a user operation from the plurality of presented simple page layouts; and executing page layout based on the selected simple page layout to generate a precise page layout result, wherein the precise page layout is generated by acquiring sizes of the document components and calculating a size of a layout region where the document components are actually arranged based on a maximum and a minimum value of the region where the document components are arranged.

10. A non-transitory computer-readable storage medium that stores a program for causing a computer to function as:

a simple layout generation unit configured to generate a plurality of simple page layouts that exemplifies page layout results based on a quantity of document components and a page layout template used in a page layout of the document component, arrangement of the document components based on the acquired layout positions is performed;

a presentation unit configured to present the plurality of simple page layouts generated by the simple layout generation unit;

a selection unit configured to select at least one of the simple page layouts according to a user operation from the plurality of simple page layouts presented by the presentation unit; and a layout result generation unit configured to execute page layout based on the simple page layout selected by the selection unit to generate a precise page layout result, wherein the precise page layout is generated by acquiring sizes of the document components and calculating a size of a layout region where the document components are actually arranged based on a maximum and a minimum value of the region where the document components are arranged.

* * * * *